United States Patent
Porfido et al.

[19]

[11] Patent Number: 5,911,895
[45] Date of Patent: Jun. 15, 1999

[54] DEVICE FOR WELDING MOLDED PLASTIC PARTS PERMITTING SIMULTANEOUS AND MUTUALLY INDEPENDENT WELDING PROCESSES

[75] Inventors: Erasmo Porfido, Schaffhausen; Jurg Steiner, Marthalen, both of Switzerland

[73] Assignee: Georg Fischer Rohrleitungssyteme AG, Switzerland

[21] Appl. No.: 08/824,897

[22] Filed: Mar. 26, 1997

[30] Foreign Application Priority Data

Mar. 28, 1996 [CH] Switzerland ............... 0813/96

[51] Int. Cl.$^6$ ............... B29C 65/30; B29C 65/34
[52] U.S. Cl. ............... 219/221; 219/544; 219/535; 219/483; 156/304.2
[58] Field of Search ............... 219/243, 227–230, 219/221, 240, 241, 535, 544, 476–480, 483, 484, 486; 156/579, 515, 583.1, 583.2, 583.8, 583.9, 379.6, 499, 379.7, 304.2, 274.2, 273.9; 228/51

[56] References Cited

U.S. PATENT DOCUMENTS

| | | | |
|---|---|---|---|
| Re. 33,716 | 10/1991 | Johnson | 219/541 |
| 3,444,732 | 5/1969 | Robbins et al. | 219/243 |
| 3,634,655 | 1/1972 | Jordan | 219/527 |
| 4,354,093 | 10/1982 | Zago | 219/225 |
| 4,469,545 | 9/1984 | Low | 219/243 |
| 4,486,650 | 12/1984 | Bridgstock et al. | 219/544 |
| 4,571,488 | 2/1986 | Reeves | 219/544 |
| 4,642,155 | 2/1987 | Ramsey | 219/535 |
| 4,735,675 | 4/1988 | Metz | 156/583.4 |
| 4,804,811 | 2/1989 | Raycher et al. | 219/130.1 |
| 4,861,967 | 8/1989 | Yoshimura | 219/241 |
| 4,994,655 | 2/1991 | Handa et al. | 219/535 |
| 5,013,376 | 5/1991 | McElroy, II et al. | 156/499 |
| 5,014,210 | 5/1991 | Postlewait et al. | 219/241 |
| 5,170,042 | 12/1992 | Bunn | 219/497 |
| 5,357,076 | 10/1994 | Blankenship | 219/121.54 |
| 5,527,406 | 6/1996 | Brath | 156/499 |
| 5,620,625 | 4/1997 | Sauron et al. | 219/494 |

FOREIGN PATENT DOCUMENTS 9408278  4/1994  WIPO .

*Primary Examiner*—John A. Jeffery
*Attorney, Agent, or Firm*—Gifford, Krass, Groh, Sprinkle, Anderson & Citkowski, P.C.

[57] ABSTRACT

An apparatus for simultaneously welding multiple molded plastic parts includes a power delivery module, a measuring arrangement, a parameter storage module, a user interface, and a controller, is designed for use with plastic parts that each have at least one fitting with a heating element and an identifying resistor. The power delivery module is designed to supply power to the multiple heating elements and includes a common power supply, multiple independently controllable power switching devices and multiple outputs, each designed for interconnection with one of the fittings. The measuring arrangement includes multiple interconnections for connecting to the heating element and identifying resistor of each fitting to which an output is connected. The measuring arrangement measures the resistance of the heating element and the identifying resistor of each fitting connected to the apparatus. The parameter storage module stores the power output level and power duration parameters for fittings of different types based on the resistance values of their heating elements and identifying resistors. The controller is connected to the user interface, the parameter storage module, the power delivery module, and the measuring arrangement. The controller operates to perform the following functions: cause the measuring arrangement to measure the resistance of the heating element and identifying resistor of each fitting; access the parameter storage module to identify the power output level and power duration parameters for each fitting; and cause the power delivery module to simultaneously deliver power to each of the outputs connected to the fittings and control the power switching devices so that power is supplied to each of the outputs for the duration and at the level identified for the fitting connected to the output.

2 Claims, 3 Drawing Sheets

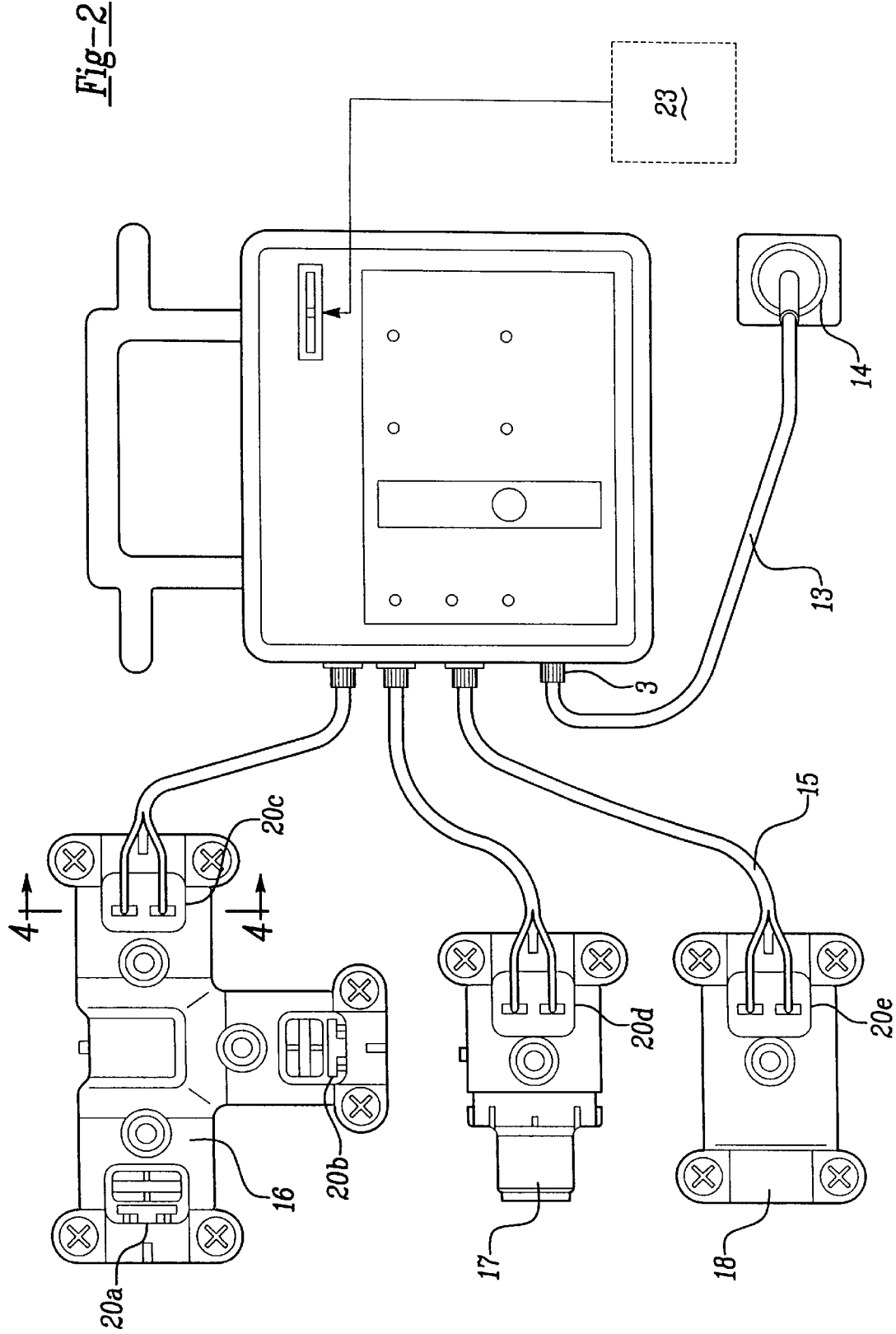

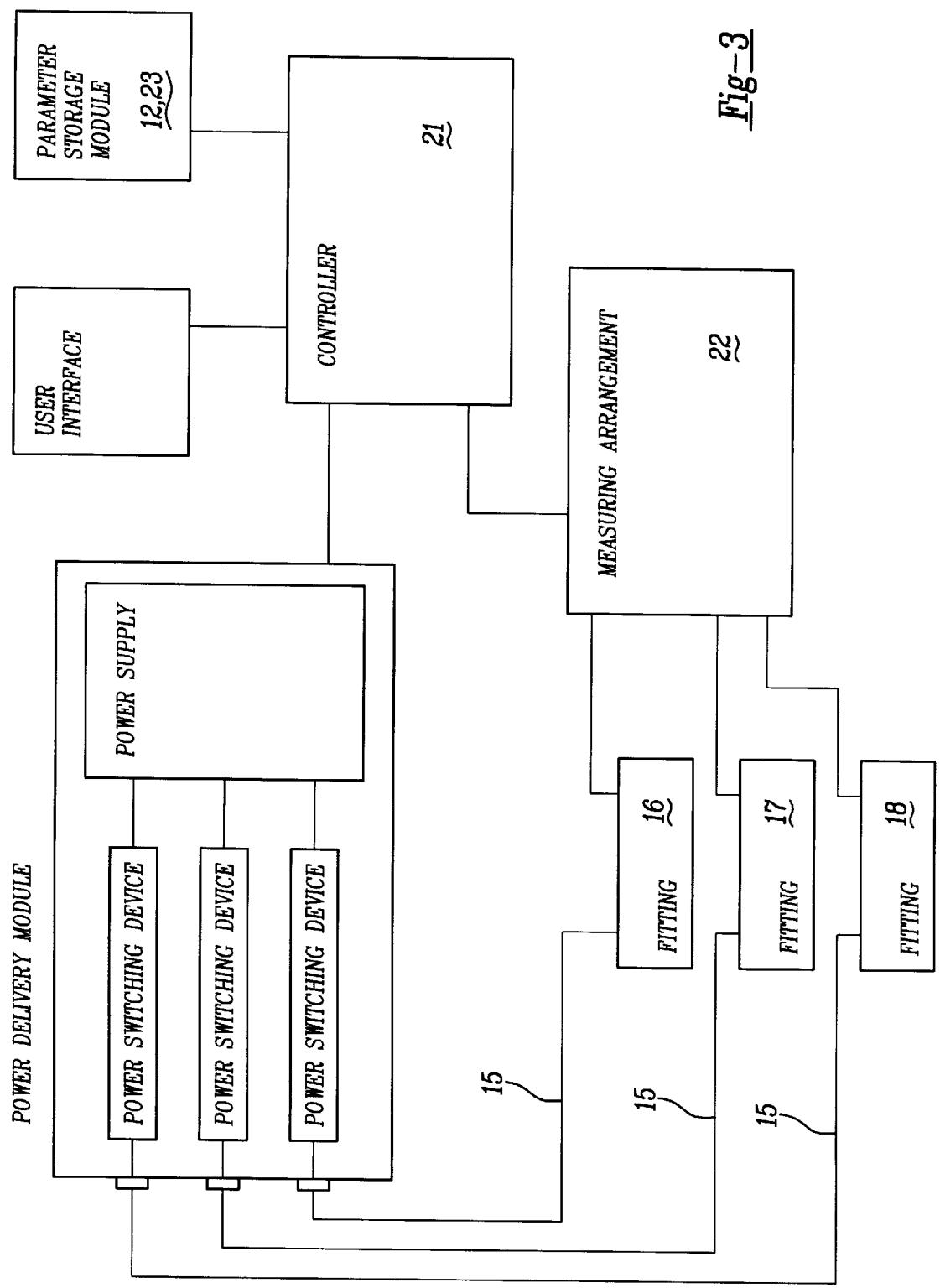

DEVICE FOR WELDING MOLDED PLASTIC PARTS PERMITTING SIMULTANEOUS AND MUTUALLY INDEPENDENT WELDING PROCESSES

FIELD OF THE INVENTION

The present invention relates to a device for welding molded parts, made of plastic.

BACKGROUND OF THE INVENTION

In order to connect tubular molded parts made of a synthetic material, welding sleeves are used as a rule. These sleeves have a heating element. By supplying electrical heating energy the heating element is heated and the sleeve is welded with the tubular molded part. In this way, a wide variety of molded parts in pipeline systems are connected together. The energy necessary for the welding process is supplied from a welding device. These devices are designed such that a variety of welding programs are stored for different molded parts and release the energy respectively required for the molded part to be welded. The energy required depends on the material, the type and the size of the molded part. The required welding time is also controlled by the molded part parameters. For example, the welding time required during the welding of pipes, while using a heater coil welding sleeve with a nominal diameter of 63 mm amounts to approximately 2 min. In the case of larger pipe dimensions, the welding time increases correspondingly. During this time, no additional welding with the welding device can take place. However, on the construction site, a multitude of such weldings must often be carried out simultaneously. Since the welding operations must take place in succession, this process requires a great deal of time.

The known welding devices are designed in such a way that in the case of new molded parts, the changed parameters, for example, dimension or material, which require changed welding parameters, can no longer be programmed into the welding device at a later time. For this reason, different welding devices are required for different molded part categories.

SUMMARY OF THE INVENTION

It is an object of the present invention to create a device for welding molded parts with which the welding process can be carried out on several different molded parts simultaneously.

In accordance with the invention, this problem is solved by means of a device for automatically and simultaneously welding multiple molded plastic parts.

BRIEF DESCRIPTION OF THE DRAWINGS

A preferred embodiment of the invention is explained in greater detail by means of the enclosed figures, wherein

FIG. 2 shows the device from FIG. 1 with three different molded parts connected, FIG. 3 is a diagram showing components of the invention.

DETAILED DESCRIPTION OF THE PREFERRED EMBODIMENTS

Figure 1:
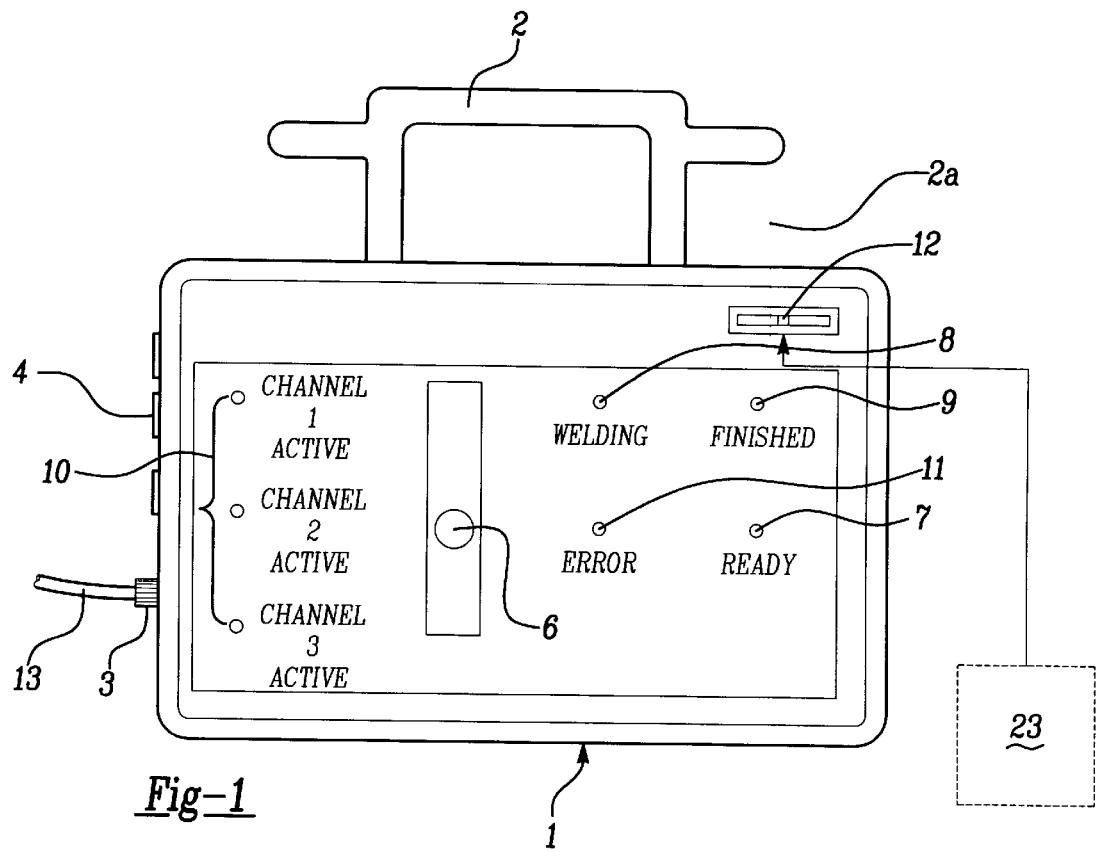
FIG. 1 shows a device of the invention.
Figure 4:
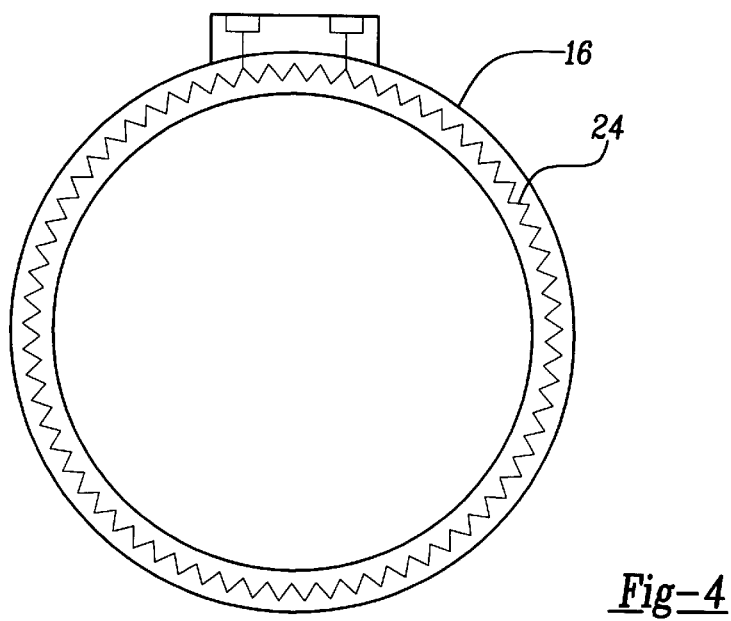
FIG. 4 is a cross sectional view of a fitting taken along lines 4—4 of FIG. 2.

FIG. 1 shows a welding device for joining molded parts made of plastic. The device has a housing (1) which consists essentially of two plastic shells and which surrounds and protects the functional units and the electronics of the device. In order to facilitate transportation, particularly at construction sites, a handle (2) is provided. Among the functional units of the welding device, in particular a supply unit and a control unit are included. The supply unit includes a line connection (3), a transformer and three output terminals (4) for connecting the welding cables (15). The energy supply to the molded parts to be welded takes place via the output terminals (4) and the welding cables (15). Several output terminals (4) with corresponding welding cables (15) may be provided.

The control unit has a processing arrangement 21 and a measuring arrangement. The measuring arrangement 22 serves for identifying a molded part connected to the welding device via a welding cable (15). This takes place by measuring a resistor 20a–20e arranged on the molded part. On the basis of the resistance value, the processing unit 21 recognizes the welding parameters and adjusts to the necessary welding current, as well as the required welding time. With these welding parameters, the energy supply can be controlled simultaneously at several different molded parts. This welding process is the reason for recognition and control of welding channels.

In the processing arrangement, all welding data of the commonly available molded parts are stored. A printed circuit board includes the processor and measuring circuits, the operating and indicator elements and the memory card plug 12. Via an interface (12) at the housing, the memory card 23, on which the welding parameters of a new molded part are stored, can be read in. This data can be read in via the processor unit 21 and are stored there.

At the front surface of the housing, the operating elements, such as a start button (6) as well as different display elements are arranged. The display elements (7, 8 and 9) indicate the operating states of a welding process: Ready, Welding and Finished. A display (10), which indicates whether the respective energy supply channel is in the welding process, is assigned to each welding channel. Display (11) indicates disruptions during a welding process.

FIG. 2 shows one application of the welding device. The welding device is connected at the line connection (3) by means of a line cable (13) via an outlet (14). Three different molded parts (16, 17 and 18) are connected to the welding device by welding cable (15). Molded part (16) is a T-piece with three branches each branch having a welding zone. Molded part (17) is a transition piece and molded part (18) is a heating coil welding sleeve with a large nominal diameter. All molded parts (16 to 18) have a predetermined resistor which is secured on a board within the molded part. The fitting resistance is the resistance of the heating coil 24. The identification of the fitting takes place via the measured product resistance and the heating coil resistance. These are recognizable by the processor unit.

The welding parameters belonging to a fitting are the welding current and the welding time.

In order to bring about a welding process, the user must operate the start button (6). The welding process is started. The welding device identifies and controls all connected energy supply channels simultaneously. Each connected molded part (16 to 18) is welded with the programmed current during the programmed time with a tubular element. The display lights (10) of the individual energy supply channels turn off as soon as the welding process has been successfully completed. The display (9) lights up as soon as the welding process with the longest welding time is ended and indicates that the welding device is ready for subsequent welding processes.

With the described welding device, it is possible to carry out several weldings with the same or a different welding energy. Since all energy supply channels are mutually independent, it is possible to undertake only one or two weldings simultaneously.

The advantage of the described invention lies in that several weldings, in which the welding parameters may vary, can be carried out simultaneously. This is time-saving and economical.

Moreover, later changes or expansions of the molded part supply, which lead to new welding parameters, can be read into the device of the invention at any time by means of a memory card.

We claim:

1. An apparatus for simultaneous and mutually independently thermally welding a plurality of molded plastic parts, each of the plastic parts having at least one fitting with a heating element and an identifying resistor, the heating element operative to heat the fitting when power is supplied to the fitting, the apparatus comprising:

a power delivery module for supplying power to the heating elements, said power delivery module having a common power supply, a plurality of independently controllable power switching devices connected to said power supply, and a plurality of outputs each adapted for interconnection with one of the fittings, one output connected to each of said plurality of switching devices, each switching device being operative to control the duration and power level of power supplied to the connected fitting;

a measuring arrangement having a plurality of interconnections for connecting to the heating element and identifying resistor of each fitting to which an output is connected, said measuring arrangement being operative to measure the resistance of the heating element and identifying resistor of each connected fitting;

a parameter storage module for storing power output level and power duration parameters for fittings of different types based on resistance values of heating elements and identifying resistors;

a user interface having an initiation means for activating the welding apparatus; and a controller operatively connected to said user interface, said parameter storage module, said power delivery module, and said measuring arrangement, said controller operative to perform the following functions
   a) cause said measuring arrangement to measure the resistance of the heating element and identifying resistor of each fitting connected to said interconnections;
   b) access said parameter storage module to identify the power output level and power duration parameters for each fitting connected to said interconnections;
   c) cause said power delivery module to simultaneously deliver power to each of the outputs connected to fittings when said initiation means is activated, and control said power switching devices so that power is supplied to each of the outputs for the duration and at the level identified for the fitting connected to the output.

2. A method of simultaneously and mutually independently thermally welding a plurality of plastic parts, said method comprising the steps of:
   a) providing a plurality of fittings, each fitting having a heating element and an identifying resistor,
   b) measuring the resistance of the identifying resistor and the heating element of each of the plurality of fittings;
   c) choosing an output power level and duration of power output for each fitting based on the resistances measured in step b);
   d) simultaneously and independently supplying power to the heating elements in each of the plurality of fittings at the output power level and for the duration chosen for each fitting.

* * * * *